(12) United States Patent
Kitzmiller et al.

(10) Patent No.: US 9,388,706 B2
(45) Date of Patent: Jul. 12, 2016

(54) METHOD AND SYSTEM FOR TUNING A TURBINE USING SECONDARY INJECTION NOZZLES IN NOZZLE RING

(71) Applicant: Fluid Equipment Development Company, Monroe, MI (US)

(72) Inventors: Ryan Kitzmiller, Toledo, OH (US); Jason B. Hunt, Monroe, MI (US)

(73) Assignee: Fluid Equipment Development Company, Monroe, MI (US)

( * ) Notice: Subject to any disclaimer, the term of this patent is extended or adjusted under 35 U.S.C. 154(b) by 834 days.

(21) Appl. No.: 13/757,034

(22) Filed: Feb. 1, 2013

(65) Prior Publication Data
US 2013/0223978 A1    Aug. 29, 2013

Related U.S. Application Data

(60) Provisional application No. 61/602,812, filed on Feb. 24, 2012.

(51) Int. Cl.

| | |
|---|---|
| F04D 29/46 | (2006.01) |
| F03B 1/04 | (2006.01) |
| F01D 17/00 | (2006.01) |
| B01D 61/06 | (2006.01) |
| F03B 3/02 | (2006.01) |
| F03B 3/18 | (2006.01) |
| F03B 11/00 | (2006.01) |
| F03B 15/04 | (2006.01) |

(52) U.S. Cl.
CPC ............... *F01D 17/00* (2013.01); *B01D 61/06* (2013.01); *F03B 3/02* (2013.01); *F03B 3/18* (2013.01);

(Continued)

(58) Field of Classification Search
CPC ............ F03B 1/04; F03B 15/00; F03B 15/02; F03B 15/04; F03B 15/20; F03B 11/002; F03B 11/004; F03B 3/04; F03B 3/14; F03B 3/145; Y02D 10/223; F04D 27/00; F04D 27/002; F04D 27/003; F04D 27/005; F04D 27/009; F04D 25/04; F04D 25/045; F04D 25/068; F04D 29/4213; F04D 29/422; F04D 29/46; F04D 29/4233; F04D 29/424; F05B 2240/10; F05B 2240/12; F05B 2240/121; F05B 2240/123; F05B 2270/10; F05B 2270/101; F05B 2270/1011; F05B 2270/1012; F05B 2270/1013; F05B 2270/1014; F05B 2270/108; F05B 2270/1081; F05B 2270/10812; F05B 2270/16; F01D 1/023; F01D 1/02; F01D 1/026; F01D 1/08

See application file for complete search history.

(56) References Cited

U.S. PATENT DOCUMENTS

| | | | |
|---|---|---|---|
| 3,835,641 A | 9/1974 | Goodrich | |
| 6,269,642 B1 * | 8/2001 | Arnold | F01D 17/165 415/163 |

(Continued)

FOREIGN PATENT DOCUMENTS

JP       2008019748 A       1/2008

OTHER PUBLICATIONS

Search Report and Written Opinion issued by Intellectual Property Office of Singapore, dated Jul. 31, 2015 regarding Application No. 11201405139T.

*Primary Examiner* — Dwayne J White
*Assistant Examiner* — Joshua R Beebe
(74) *Attorney, Agent, or Firm* — Harness, Dickey & Pierce, P.L.C.

(57) ABSTRACT

A turbine and method of operating the same includes a housing having a volute and an outlet and an impeller rotatable coupled to the housing. The turbine includes a nozzle ring having a plurality of primary nozzles and a plurality of secondary nozzles. The plurality of primary nozzles and the plurality of secondary nozzles direct fluid toward the impeller. An auxiliary valve assembly selectively communicates fluid from the volute to the plurality of secondary nozzles. An actuator is coupled to the valve auxiliary assembly moving the auxiliary valve assembly from a first position communicating fluid from the volute into the secondary nozzles to a second position blocking flow of fluid to the secondary nozzles.

27 Claims, 17 Drawing Sheets

(52) U.S. Cl.
CPC ............... *F03B 3/183* (2013.01); *F03B 11/004* (2013.01); *F03B 15/04* (2013.01); *F05B 2220/40* (2013.01); *F05B 2220/62* (2013.01); *Y02E 10/223* (2013.01)

(56) References Cited

U.S. PATENT DOCUMENTS

| | | | |
|---|---|---|---|
| 7,059,129 B2* | 6/2006 | Zollinger | F01D 17/165 415/160 |
| 8,191,368 B2* | 6/2012 | Garrett | F01D 17/143 415/157 |
| 2003/0014972 A1* | 1/2003 | Arnold | F01D 5/141 60/602 |
| 2010/0037605 A1* | 2/2010 | Garrett | F01D 17/167 60/602 |
| 2010/0126168 A1* | 5/2010 | Li | F01D 17/16 60/602 |
| 2010/0266390 A1* | 10/2010 | Henderson | F01D 17/141 415/151 |
| 2011/0194929 A1* | 8/2011 | Denholm | F01D 17/143 415/157 |

* cited by examiner

FIG. 1A
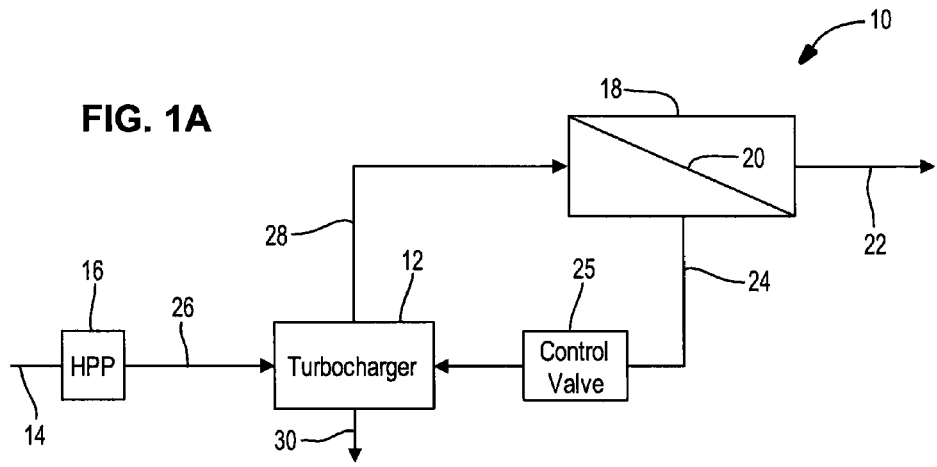
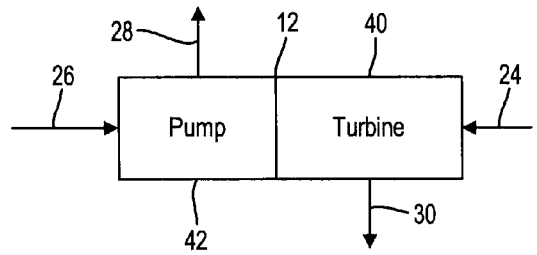
FIG. 1B
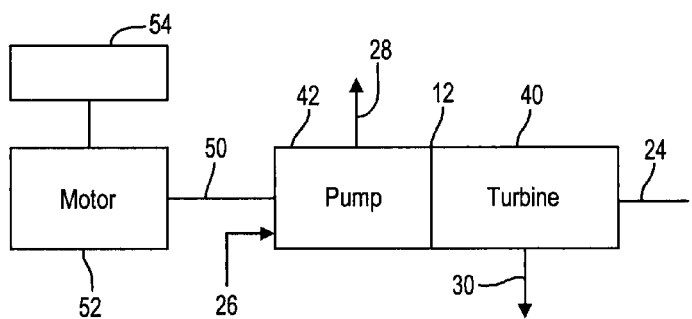
FIG. 1C

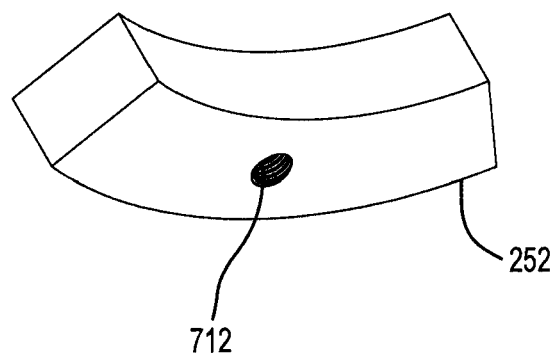
FIG. 9
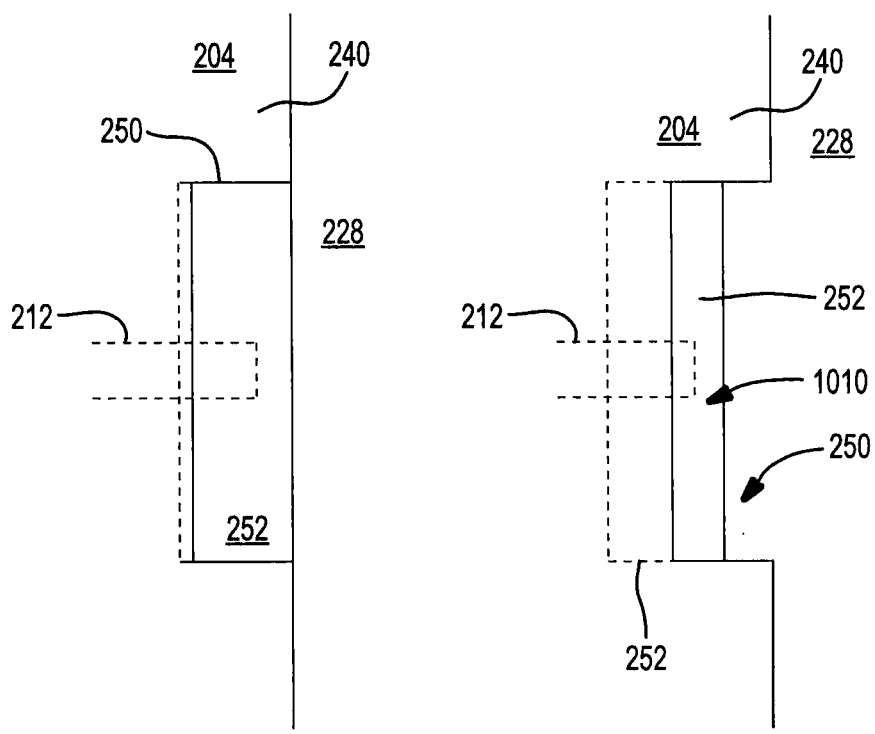
FIG. 10A   FIG. 10B

FIG. 18B
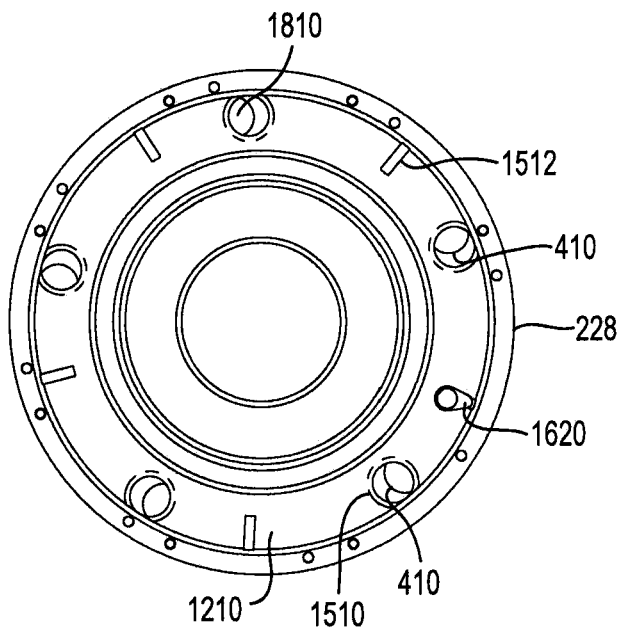
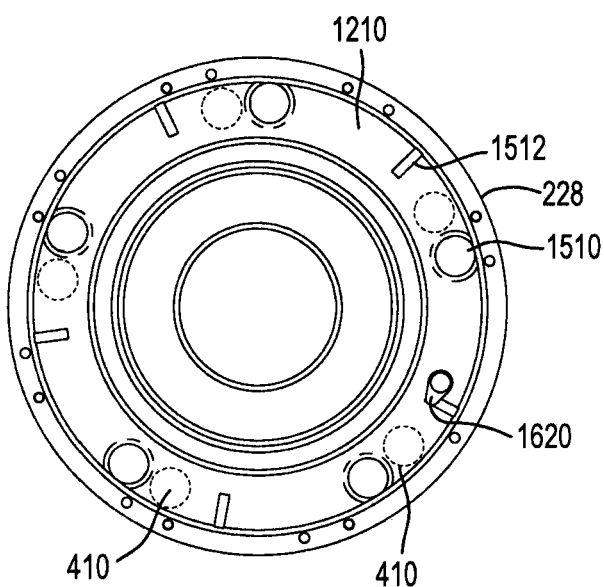
FIG. 18C

US 9,388,706 B2

METHOD AND SYSTEM FOR TUNING A TURBINE USING SECONDARY INJECTION NOZZLES IN NOZZLE RING

RELATED APPLICATION

This application is a non-provisional application of provisional application 61/602,812, filed Feb. 24, 2012, the disclosure of which is incorporated by reference herein.

TECHNICAL FIELD

The present disclosure relates generally to turbines, and, more specifically, to a method and system for fine tuning turbine resistance using secondary nozzles in a nozzle ring.

BACKGROUND

The statements in this section merely provide background information related to the present disclosure and may not constitute prior art.

Turbochargers are used for many applications. A turbocharger includes a pump portion and a turbine portion. Turbochargers are used for recovering energy from a pressurized stream of fluid. Excessive pressure in the turbine portion is used to drive the pump portion. One use for a turbocharger is recovering energy from a brine outlet of a reverse osmosis membrane assembly.

Reverse osmosis systems operate in a wide range of operating conditions for any given flow while seeking to maintain a high level of performance. Various turbine configurations are known for improving levels of performance for the turbine.

In one known turbine, single volute nozzle volute systems use a valve stem to allow bypass fluid from the turbine inlet to the impeller. Some improvement in performance is achieved. However, single nozzle volute bypass has lower efficiency and unbalanced radial load on the impeller due to the pressure distribution around a periphery.

Another type of turbine system is a variable vane nozzle that has moving vanes to change the vane nozzle size. One problem with this configuration is lower efficiency due to losses at the entrance to the vane, lower efficiency due to leakage through the moving part clearances, the mechanical parts are subject to wear and the complex assembly procedure involved in assembling the variable vane.

SUMMARY

The present disclosure provides a turbine design that allows for fine tuning of the turbine resistance using secondary nozzles that are selectively controlled to increase the amount of fluid from the volute to the impeller.

In one aspect of the disclosure, a turbine includes a housing having a volute and an outlet and an impeller rotatable coupled to the housing. The turbine includes a nozzle ring having a plurality of primary nozzles and a plurality of secondary nozzles. The plurality of primary nozzles and the plurality of secondary nozzles direct fluid toward the impeller. An auxiliary valve assembly selectively communicates fluid from the volute to the plurality of secondary nozzles. An actuator is coupled to the valve auxiliary assembly moving the valve auxiliary assembly from a first position communicating fluid from the volute into the secondary nozzles to a second position blocking flow of fluid to the secondary nozzles.

In another aspect of the disclosure, method of operating a turbine includes communicating fluid from a volute of the turbine through a plurality of primary nozzles of a nozzle ring to rotate an impeller on a shaft, actuating an actuator assembly to move an auxiliary valve assembly to open a plurality of secondary nozzles of the nozzle ring to fluid from the volute and, thereafter, rotating the impeller with fluid from the plurality of primary nozzles and plurality of secondary nozzles.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1A is a block diagrammatic view of a reverse osmosis system that includes a turbocharger.

FIG. 1B is a block diagrammatic view of the turbocharger of FIG. 1A.

FIG. 1C is a block diagrammatic view of a turbocharger and motor assembly referred to as a HEMI.

FIG. 9 is a perspective view of the auxiliary plate.

FIGS. 10A and 10B represent the auxiliary plate relative to the opening in a closed position and an open position respectively.

FIGS. 18A-18C are respective end views of the rotary auxiliary plate relative to the nozzle ring having the openings of the nozzle ring aligned with the secondary nozzles, the openings of the rotary auxiliary plate partially aligned with the secondary nozzles and the openings of the auxiliary plate not aligned with the secondary nozzles.

DETAILED DESCRIPTION

Figure 2A:
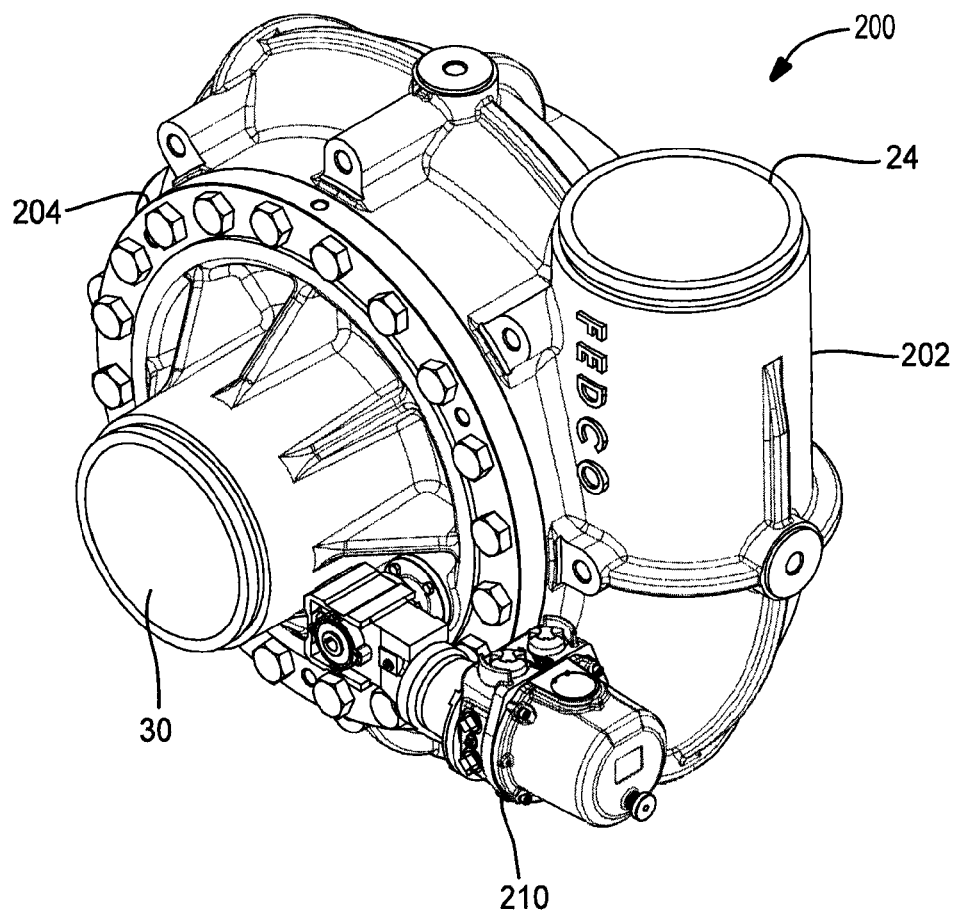
FIG. 2A is a perspective view of the turbocharger according to the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

The present disclosure improves the overall performance of hydraulic turbines while maintaining flexibility to meet various off-design criteria. Typically, turbochargers are designed for a limited set of operating conditions. The improved design allows the turbochargers to meet off-design criteria. The nozzle ring design includes secondary nozzles that allow the turbine to meet peak performance at the desired duty point without sacrificing variability. The fixed geometry of the nozzles allows the total pressure to be maintained while removing the potential for leakage that is often manifested in variable vane designs. As will be described further below, the nozzles are placed symmetrically around the periphery of the impeller so that the pressure distribution around the impeller is balanced. Balancing the pressure improves bearing life because side loading of the bearings is reduced. Reducing side loading of the bearings reduces bearing failure and thus improves the longevity of the equipment.

Referring now to FIG. 1A, a reverse osmosis system 10 that includes a turbocharger 12 is set forth. In this example, feed fluid from an input manifold 14 is communicated through a high pressure pump 16 which in turn is communicated to a membrane housing 18 through the turbocharger 12. The membrane housing 18 includes a reverse osmosis membrane 20 that is used to generate fresh water from sea water. Fresh water is generated at the permeate output 22 of the membrane housing. A brine stream from the membrane housing is directed to an inlet 24 of the turbocharger 12 through a brine control valve 25. The turbocharger 12 uses the energy from the high pressure brine stream to increase feed fluid pressure. The pressurized feed fluid from the high pressure pump 16 is received through a pump input 26. The turbocharger 12 increases the pressure of the feed fluid and increases the pressure of the feed fluid at the pump output 28. Waste from the turbocharger 12 is discharged at a lower pressure through the turbocharger outlet 30. Although one specific example of a reverse osmosis system 10 is illustrated, various examples for reverse osmosis systems will be evident to those skilled in the art. By providing the turbocharger 12, the required pressure from the high pressure pump is reduced and the overall energy consumed by the system is also reduced as compared to a system without the turbocharger 12.

Referring now to FIG. 1B, the turbocharger 12 is illustrated in further detail. The turbocharger 12 includes a turbine portion 40 and a pump portion 42. The turbine portion 40 recovers energy from the high pressure stream by rotating and ultimately rotating the components within the pump portion 42. The pump is used to increase the pressure of fluid to the input of the membrane housing 18.

Referring now to FIG. 1C, the turbocharger 12 may also be incorporated into a system that includes a common shaft 50 that extends not only through the pump and turbine portion illustrated in FIG. 1B but extends to a motor 52. The motor 52 includes a controller 54 the addition of the motor 52 allows the turbocharger to act as a pump when desired. The motor 52 may also act as a generator to recover the excess power generated.

Figure 2B:
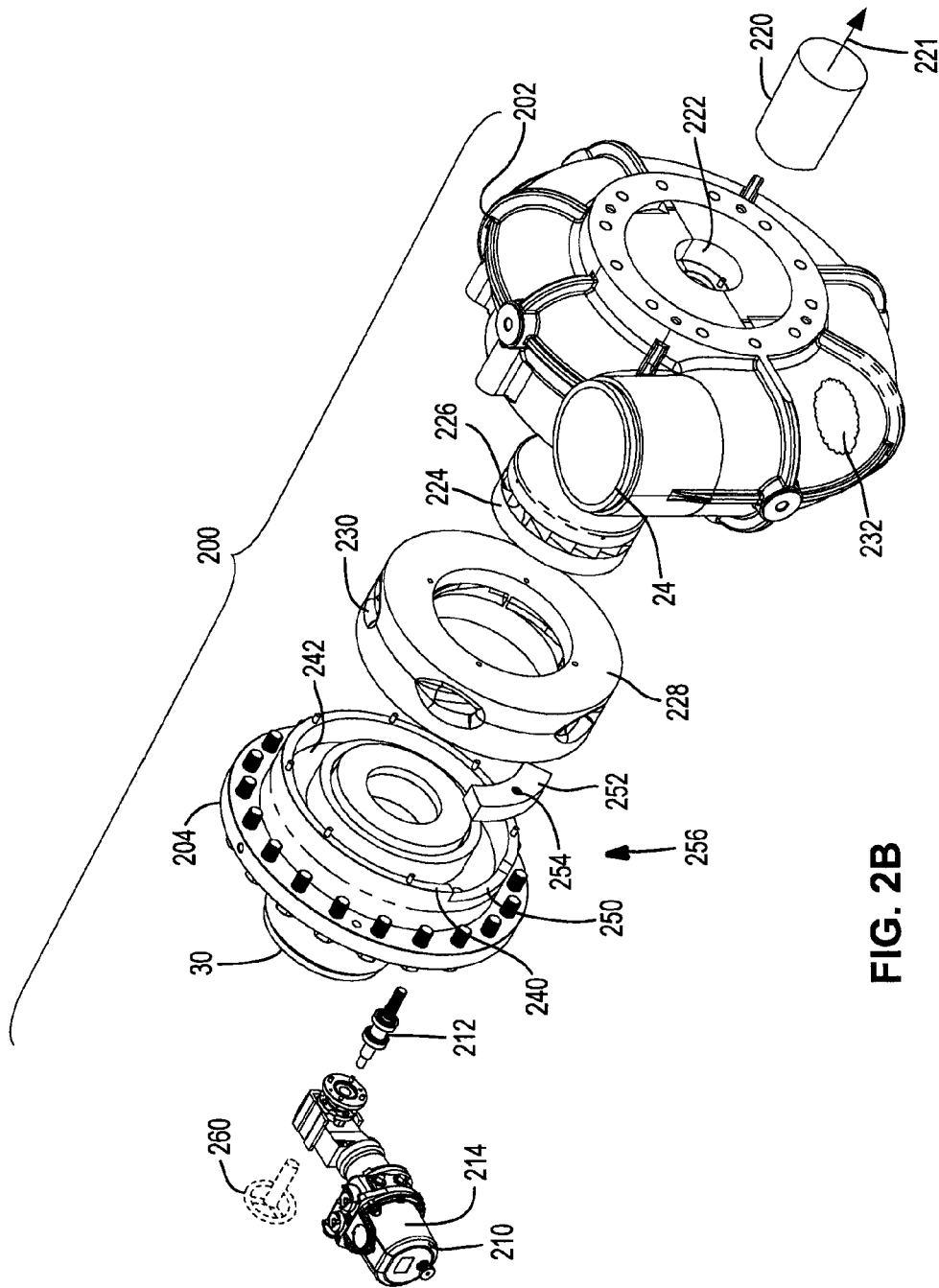
FIG. 2B is an exploded view of the turbocharger.

Referring now to FIGS. 2A and 2B, an assembled view and an exploded view of a turbine assembly 200 are illustrated. In this example, the turbine includes a turbine housing assembly 202 and a turbine end cap assembly 204. The turbine housing assembly 202 includes the brine stream the inlet 24. The end cap assembly includes the turbine outlet 30.

The end cap assembly 204 has an actuator assembly 210 coupled thereto. The actuator assembly 210 is coupled to a valve stem assembly 212 that extends through the end cap assembly 204. The actuator assembly 210 may include a motor 214 used for rotating the valve stem assembly 212

The turbine assembly 200 has a shaft 220 that extends into the shaft opening 222. The shaft 220 is coupled to and rotates with a turbine impeller 224. The shaft represents the axis of rotation of the impeller 224. The shaft may extend out of the turbine housing into the pump portion of the turbocharger. The impeller 224 has vanes 226 that are used to receive pressurized fluid and rotate the shaft 220.

A nozzle ring 228 is disposed within the turbine assembly 200. The nozzle ring 228 includes primary nozzles 230 that direct fluid from the volume of the volute 232 within the turbine assembly 200. The primary nozzles 230 direct fluid to rotate the impeller 224.

A wall 240 extends from the end cap assembly and is used to provide a separation between the volute 232 and an auxiliary chamber 242. The wall 240 extends in an axial direction relative to the shaft 220 which defines the axis of rotation of the turbine assembly 200.

The wall 240 includes an opening 250 that allows fluid to be communicated from the volute 232 into the auxiliary chamber 242. The opening 250 is selectively opened and closed using an auxiliary plate 252 to form a fluid clearance (described below). The fluid clearance is bounded by the turbine housing assembly 202 and the wall 240 of the end cap assembly 204. The auxiliary plate 252 is disposed within the auxiliary chamber 242. The auxiliary plate 252 moves in an axial direction relative to the axis of rotation 221 defined by the shaft 220. The valve stem assembly 212 may be threaded and a hole 254 within the auxiliary plate may also be correspondingly threaded. The actuator assembly 210 may rotate the valve stem assembly 212. The rotation engages the threads within the hole 254 to move the auxiliary plate 252 in an axial direction relative to the axis of rotation 221 to selectively open and close the hole 254 so that fluid may flow through or be stopped from flowing through from the volute 232 into the auxiliary chamber 242.

An auxiliary valve assembly 256 in the first example set forth above includes the auxiliary plate 252 and the actuator 210. The auxiliary valve assembly 256 may also include the valve stem assembly 212.

A hand actuator 260 may be used to replace the actuator assembly 210. The hand actuator 260 may act to manually turn the valve stem assembly 212 to open and close the opening to fluid flow from the volute 232.

Figure 3:
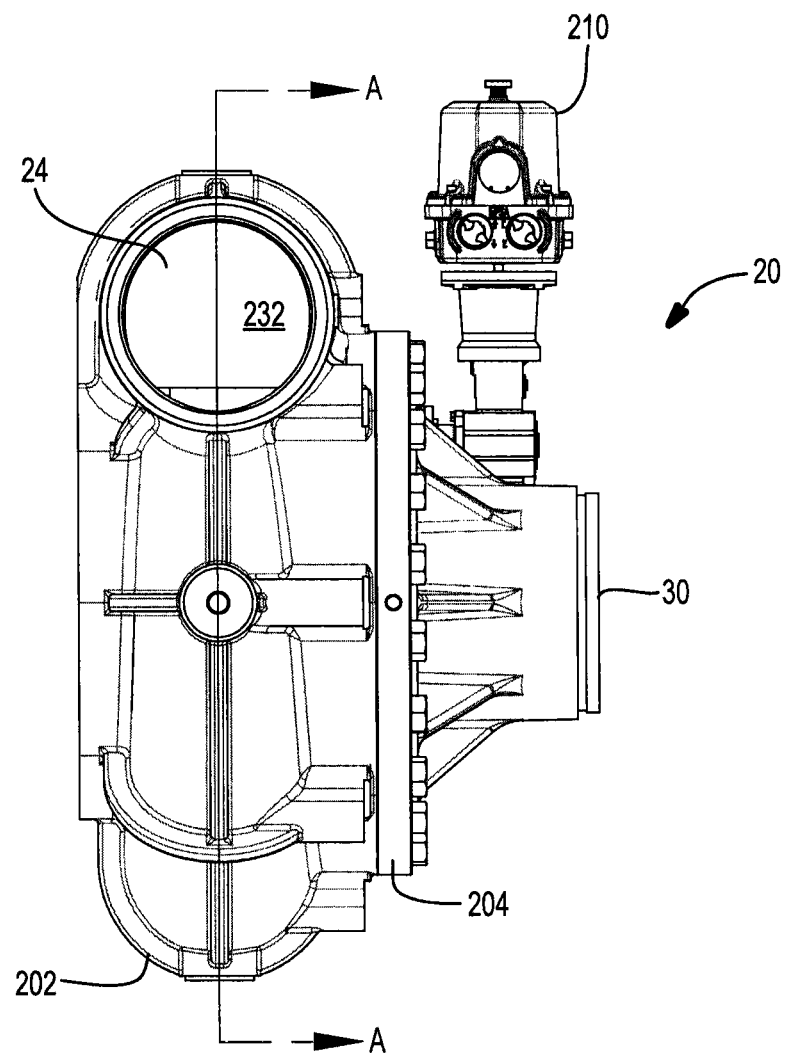
FIG. 3 is an end view of the turbocharger from the inlet end.

Referring now to FIG. 3, an end view of the turbine assembly 200 illustrating the turbine housing assembly 202, the volute 232, the end cap assembly 204 and the outlet 30 are set forth in an assembled manner. The actuator assembly 210 coupled to the end cap assembly 204 is also set forth. In this example, a section A-A is taken through the turbine inlet 24 and the turbine housing assembly 202.

Figure 4:
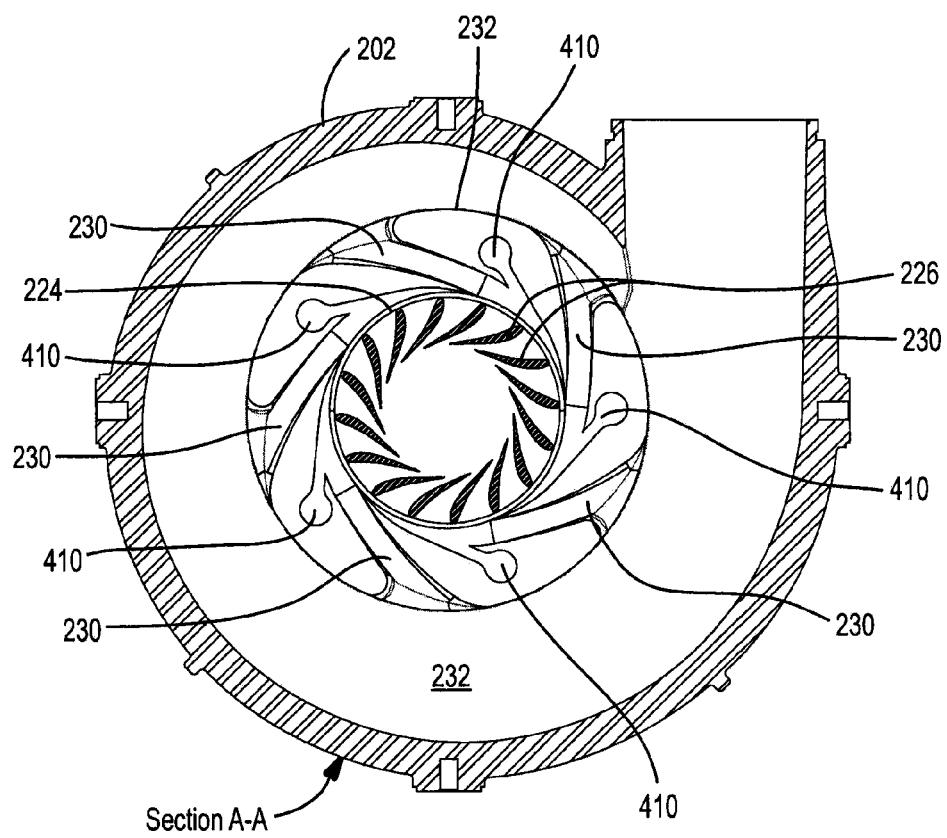
FIG. 4 is a cross-sectional view along line A-A of FIG. 3.

Referring now to FIG. 4, section A-A of FIG. 3 is illustrated in further detail. In this example the volute 232 is illustrated in further detail. Likewise, the section also includes the nozzle ring 228. As is illustrated, the nozzle ring 228 includes primary nozzles 230 that are spaced symmetrically around the nozzle ring 228. The primary nozzles 230 direct fluid from the volute 232 toward the vanes 226 of the impeller 224.

As will be further described below, the nozzle ring 228 may also include secondary nozzles 410 also spaced symmetrically around the nozzle ring 228. As is illustrated, five secondary nozzles 410 and five primary nozzles 230 are provided in the nozzle ring 228. The primary nozzles 230 are each fluidly coupled to a respective secondary nozzles 410. As will be described below the secondary nozzles are selectively fluidically coupled to the volute as will be described in detail below. As will be described below the secondary nozzles are selectively used to enhance operation using the primary nozzles.

Figure 5:
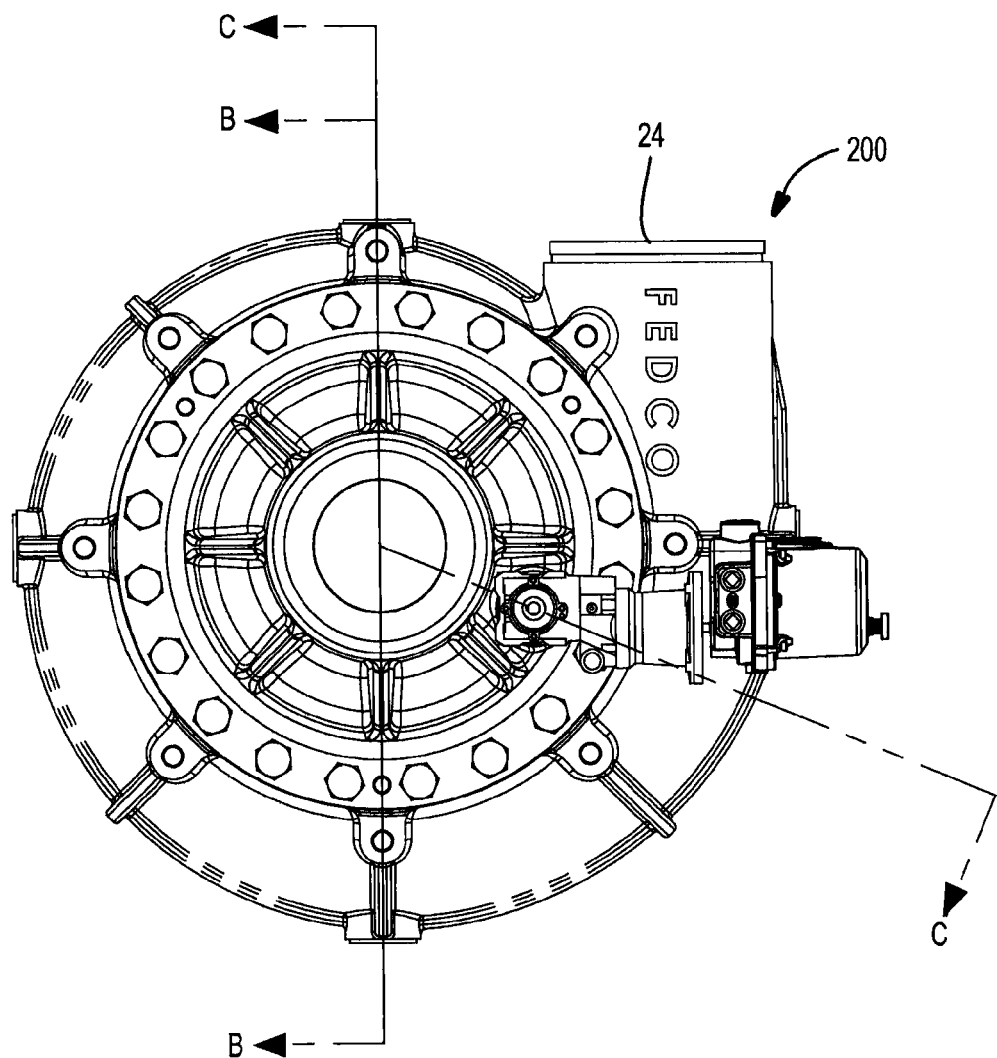
FIG. 5 is an end view from the outlet end of the turbocharger.

Referring now to FIG. 5, an end view of the turbine assembly 200 is set forth. The turbine assembly 200 will be described in further detail relative to section B-B and section C-C.

Figure 6:
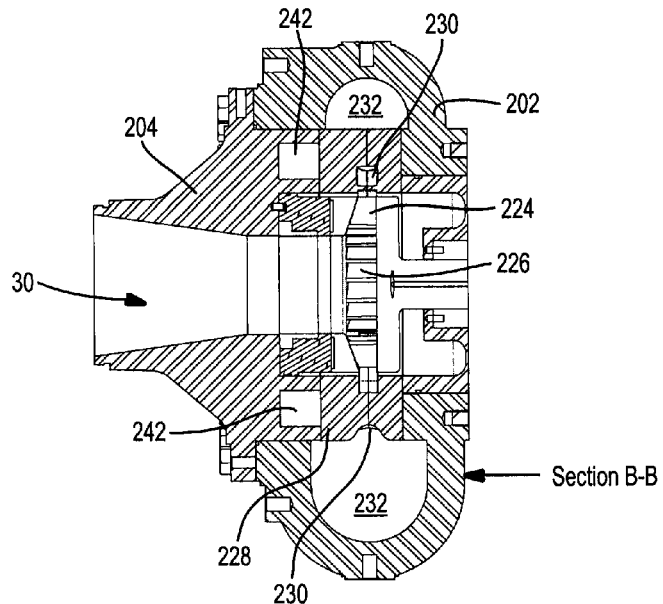
FIG. 6 is a cross-sectional view corresponding to section B-B of FIG. 5.

Referring now to FIG. 6, section B-B is illustrated in further detail. In this view the auxiliary chamber 242 which is annular in shape is illustrated. The position of the nozzle ring 228 and the primary nozzles 230 are illustrated. As mentioned above, fluid passes from the volute 232 through the primary nozzles 230 toward the impeller 224 and the impeller vanes 226. The fluid in the volute 232 is at a high pressure relative to the pressure at the outlet 30.

Figure 7:
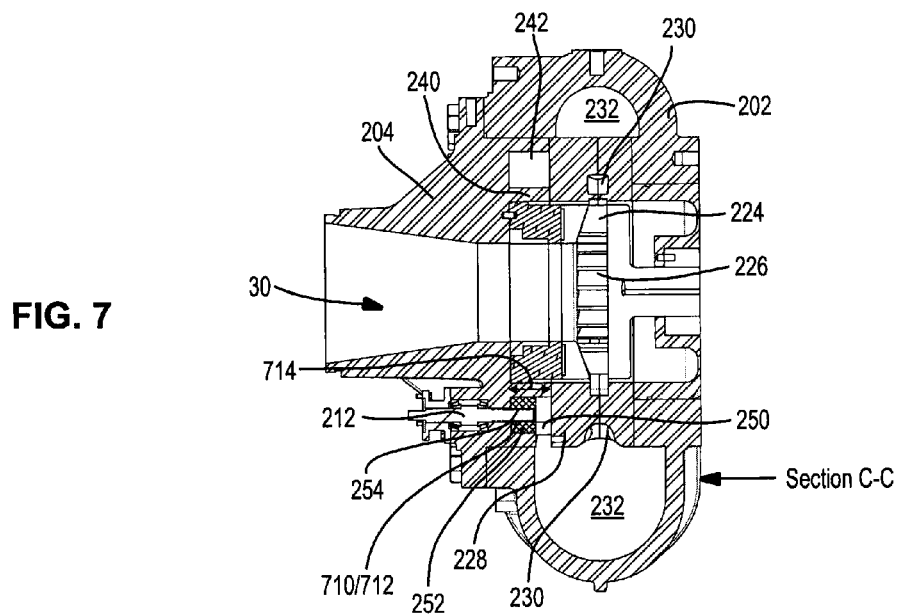
FIG. 7 is a cross-sectional view of the turbocharger along line C-C of FIG. 5.

Referring now to FIG. 7, the section C-C of FIG. 5 is illustrated in further detail. In this example, the section is also through the auxiliary valve stem assembly 212. The wall 240 which is annular in shape is also illustrated with the opening 250. The auxiliary plate 252 is illustrated with the hole 254 for receiving the valve stem assembly 212. As mentioned above, threads 710, 712 on the valve stem assembly 212 and a hole 254 of the auxiliary plate 252 respectively, are used to move the auxiliary plate in the direction illustrated by the arrow 714. In this view, the auxiliary plate 252 is illustrated in the open position so that fluid flows from the volute 232 into the auxiliary chamber 242.

Figure 8A:
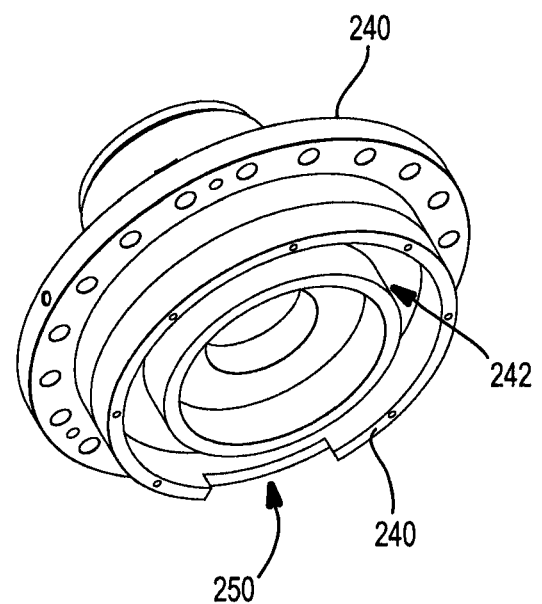
FIG. 8A is a perspective view of the end cap of the turbocharger.
Figure 8B:
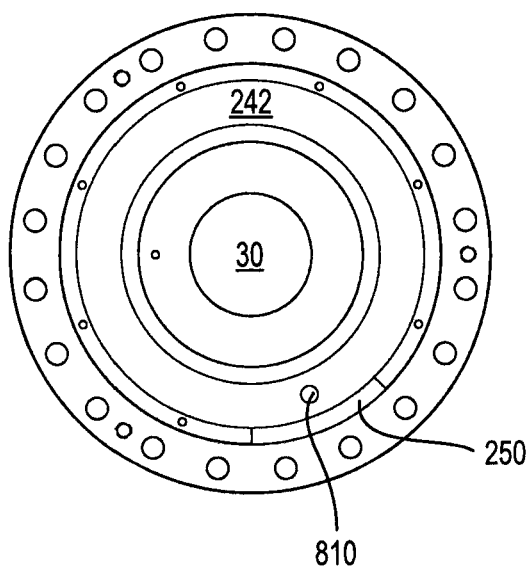
FIG. 8B is an end view of the end cap of the turbocharger.

Referring now to FIGS. 8A and 8B, views of the end cap 204 are set forth. In this example, the opening 250 in the wall 240 that separates the volute from the auxiliary chamber 242 is set forth. An opening 810 through the end cap assembly 204 is used to receive the valve stem assembly 212 illustrated in FIG. 2B.

Referring now to FIG. 9, a perspective view of the auxiliary plate 252 is illustrated. In this example, the hole 254 having inner threads 712 is illustrated. The inner threads mesh with the outer threads 710 of the valve stem assembly 212.

Referring now to FIGS. 10A, a detailed view of the opening 250 in the wall 240 of the end cap assembly 204 is illustrated in further detail. In this example, the opening 250 is closed by the auxiliary plate 252. The other boundary of the opening is the nozzle ring 228.

Referring now to FIG. 10B, the auxiliary plate 252 is illustrated in an open position so that the opening 250 permits fluid from the volute 232 into the auxiliary chamber 242 through the fluid clearance 1010. The amount that auxiliary plate 252 opens changes the area of the fluid clearance 1010. The amount of fluid may be regulated or changed by moving the auxiliary valve stem assembly 212. Various sizes of fluid clearances may be left between the opening 250 and the nozzle ring 228 depending upon the desired operating characteristics (such as turbine resistance) of the turbine.

Figure 11A:
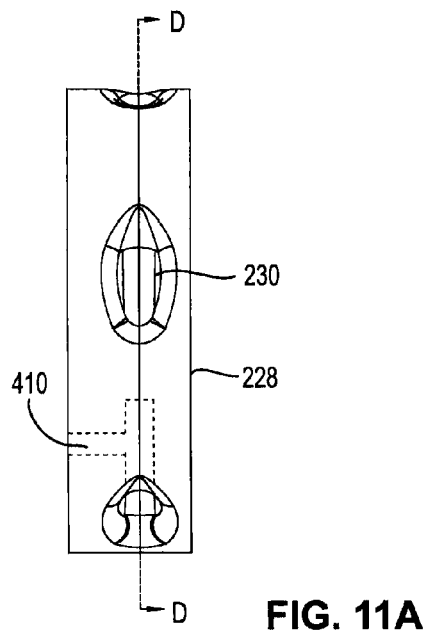
FIGS. 11A and 11B illustrate a detailed view of the nozzle ring.
Figure 11C:
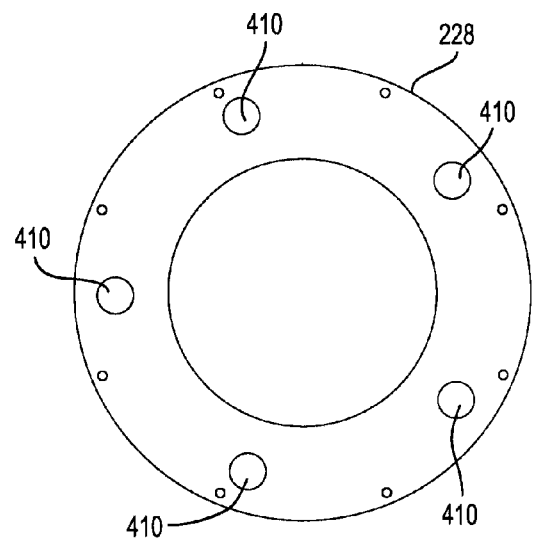
FIG. 11C is an end view of the nozzle ring.
Figure 11B:
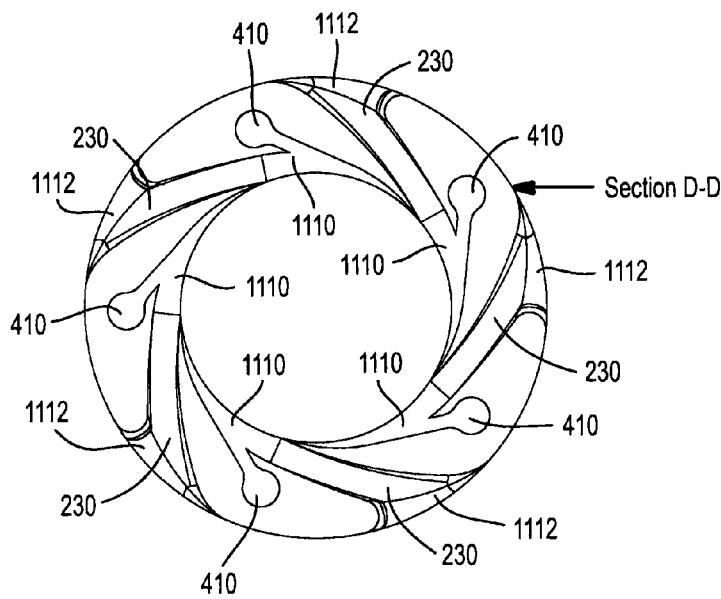

Referring now to FIGS. 11A and 11B, the nozzle ring 228 is illustrated in further detail. FIG. 11B shows section D-D of FIG. 11A. In this example, the primary nozzles 230 are illustrated in further detail. The secondary nozzles 410 that are in fluid communication with the primary nozzles 230 are also illustrated. The fluid in the primary nozzles 230 and secondary nozzles 410 are fluidically combined and are directed to the impeller through a common outlet 1110. An inlet 1112 of the primary nozzles 230 are disposed on an annular axially extending (cylindrical) surface of the nozzle ring.

Referring now also to FIG. 11C, the end view of the nozzle ring 228 is illustrated having the secondary nozzles 410 on the lateral surface (relative to the axis of rotation of the shaft). The inlet of the secondary nozzles 410 extend into the surface in an axial direction relative to the axis of rotation of the impeller. The surface illustrated in FIG. 11C is perpendicular to the axis of rotation of the impeller and shaft.

In operation, the auxiliary plate 252 is controlled from an open position to a closed position and positions therebetween based on movement of the valve stem assembly 212. By controlling the position of the auxiliary plate 252, the effective size of the fluid clearance 1010 may be changed. This allows greater or less fluid into the auxiliary chamber 242. To lower the turbine resistance, the auxiliary plate 252 is moved in an axial direction to allow the effective opening relative to the opening 250 to increase. Of course, other directions such as around the axis in an annular direction may be used. Increasing the fluid from the volute into the auxiliary chamber 242 reduces the turbine resistance. When the auxiliary plate 242 exposes the auxiliary chamber 242 to the volute, the secondary nozzles 410 direct fluid from the auxiliary chamber through the secondary nozzles into the primary nozzles 230 of the nozzle ring 228. The fluid from both the primary nozzles and the secondary nozzles 410 are used to rotate the impeller 224 by directing fluid toward the vanes 226.

In summary, the rotating of the auxiliary valve stem assembly causes the auxiliary plate 252 to move in an axial direction and thereby opening the fluid clearance 1010 between the volute and the auxiliary chamber in a desired amount. Fluid from the auxiliary chamber 242 is directed to the impeller through the secondary nozzles when at least some fluid clearance 1010 is left by the position of the auxiliary plate 252. The primary nozzles 230 also direct fluid to the impeller 224 during operation and are not selectively controlled.

Figure 12:
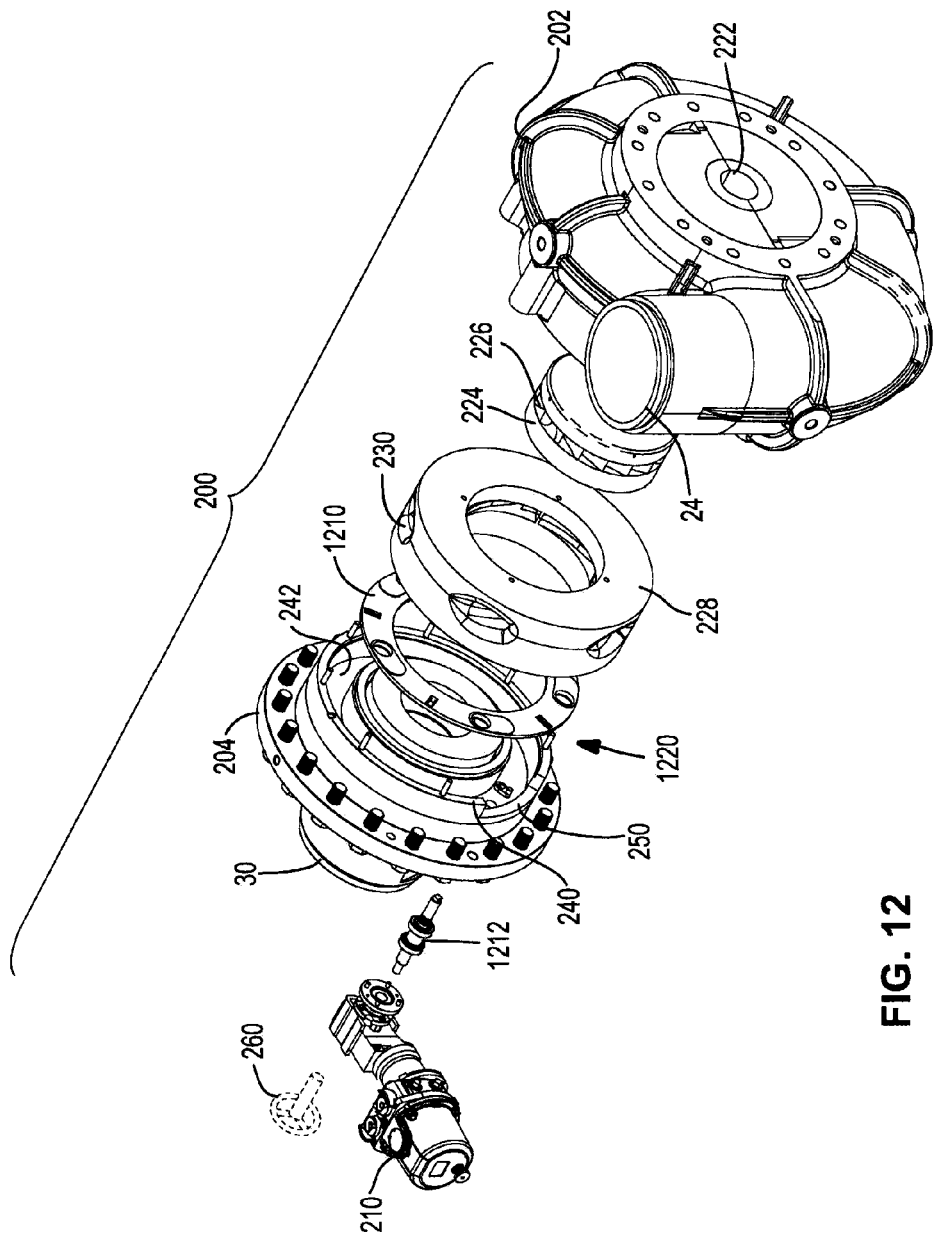
FIG. 12 is an exploded view of a second example of the disclosure.

Referring now to FIG. 12, an exploded view of a second example of a turbine assembly 200' is illustrated. In this example, the same reference numerals are used to illustrate the same components set forth in FIGS. 1-11. In this example rather than the auxiliary plate 252 that is controlled or moved by the auxiliary valve stem assembly, a rotating auxiliary plate 1210 is rotated by a cam (illustrated below) that is coupled to the auxiliary valve stem assembly 1212. Actuator assembly 210 has a motor that rotates the auxiliary valve stem assembly 212 to move the rotary auxiliary plate 1210 into and out of alignment with the secondary nozzles on the impeller 224.

An auxiliary valve assembly 1220 in the first example set forth above includes the rotary auxiliary plate 1210 and the actuator 210. The auxiliary valve assembly 1220 may also include the valve stem assembly 1212.

Figure 13:
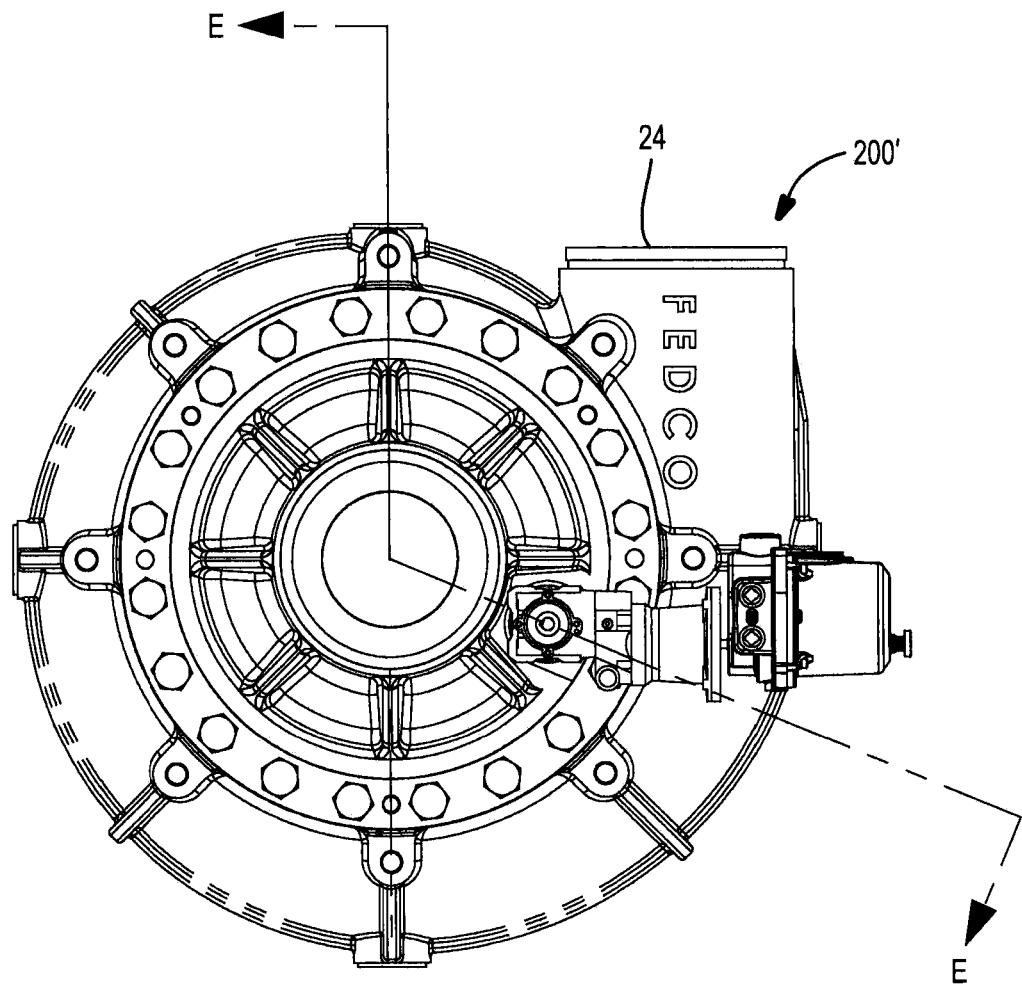
FIG. 13 is an end view of the second example of the disclosure form the outlet end.

Referring now to FIG. 13, an end view of the turbine assembly 200' of the second example is illustrated with section lines illustrating section E-E.

Figure 14:
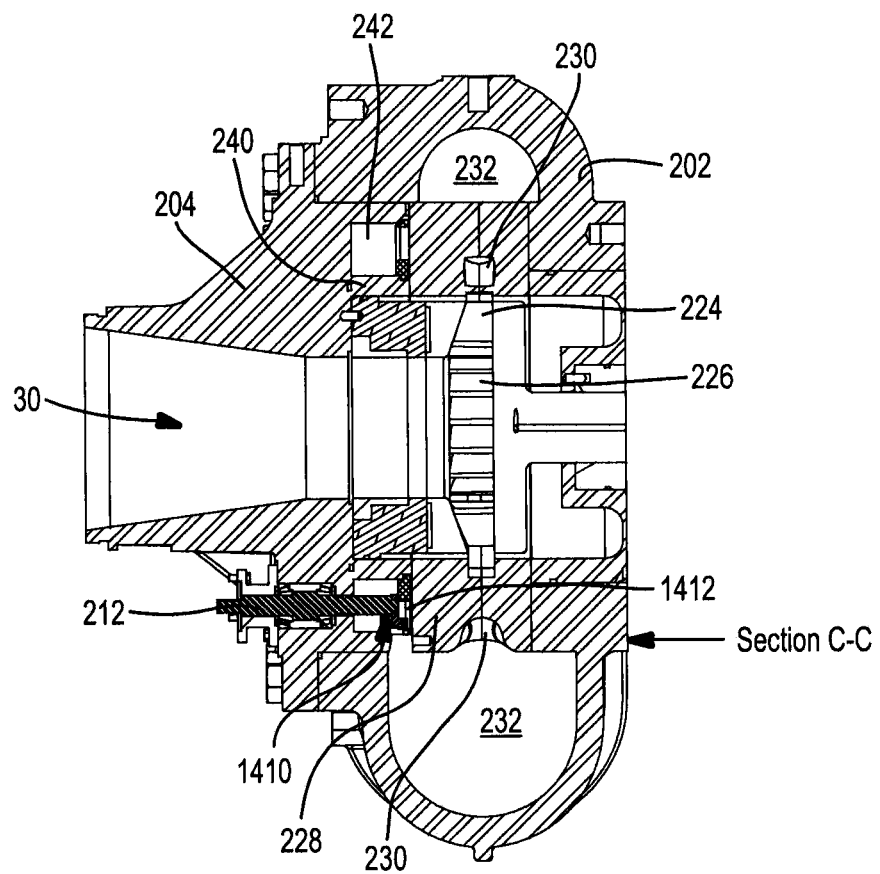
FIG. 14 is a cross-sectional view of the second example of the turbocharger along line E-E of FIG. 13.

Referring now to FIG. 14, a cross-sectional view of section E-E of FIG. 13 is set forth. In this example, the auxiliary valve stem assembly 212 is illustrated within the end cap assembly 204 in this example, the auxiliary chamber 242 is always exposed to the volute through the passage 1410. The rotating auxiliary plate 1210 is rotated into and out of position as would be further described below. A cam 1412 rotates and thus allows the rotating auxiliary plate 1210 to rotate to allow the openings in the auxiliary plate to align with the secondary nozzles. This will be further described below.

Figure 15A:
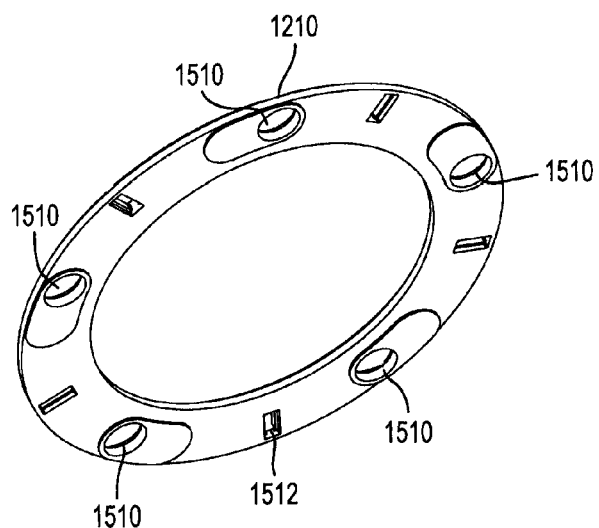
FIGS. 15A and 15B are perspective and bottom views of the rotary auxiliary plate according to the second example of the disclosure.
Figure 15B:
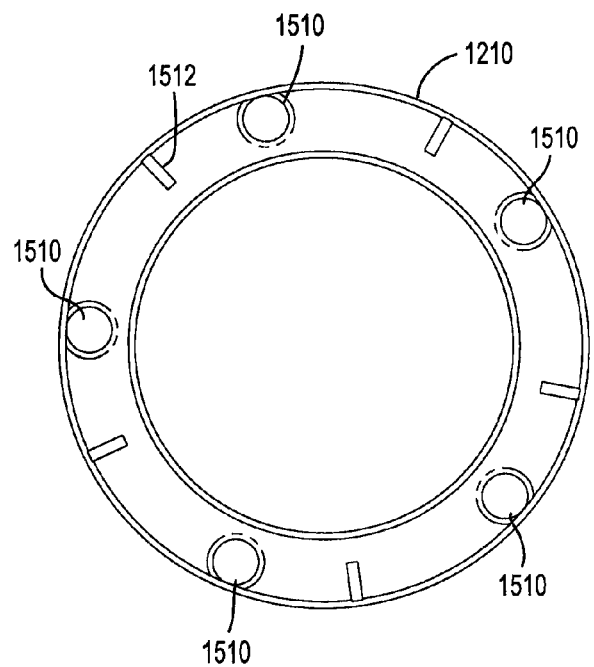

Referring now to FIGS. 15A and 15B, a top view and bottom view of the rotating auxiliary plate 1210 is set forth. In this example the rotating auxiliary plate includes openings 1510 spaced symmetrically around the rotating auxiliary plate 1210. The position of the openings 1510 correspond to the position of the secondary nozzles in the nozzle ring 228.

At least one slot 1512 is positioned within the rotary auxiliary plate 1210. The slot 1512 is used to engage a cam (shown in FIGS. 16A, 16B) for rotating the auxiliary plate relative to the nozzle ring 228. Relative to the rotary auxiliary plate the slot 1512 extends radially inward.

Figure 16A:
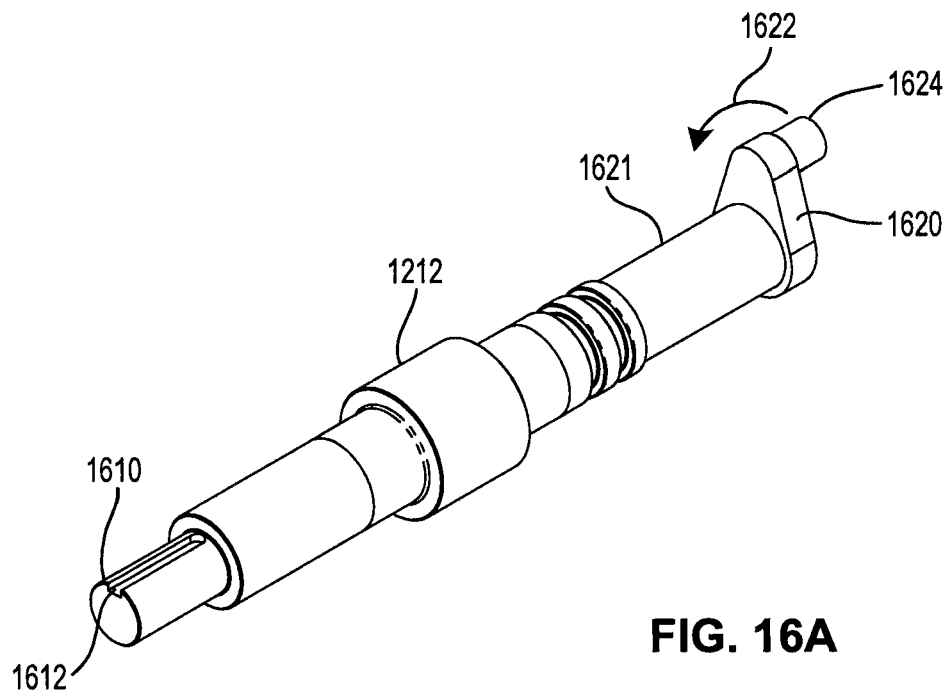
FIG. 16A is a perspective view of the second example of the auxiliary valve assembly.
Figure 16B:
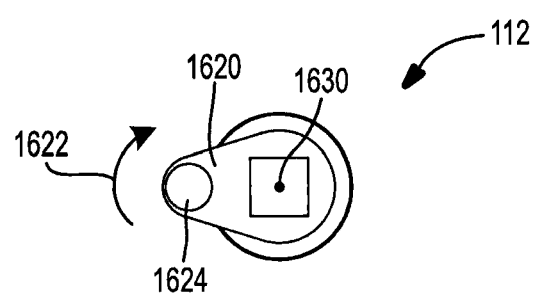
FIG. 16B is an end view of the auxiliary valve stem assembly of the second example.

Referring now to FIGS. 16A and 16B, the auxiliary valve stem assembly 1212 is illustrated in further detail. The auxiliary valve stem assembly 1212 has a first end 1610 that is used to engage a motor. A slot 1612 may engage a key (not shown) within the valve stem assembly for rotating the auxiliary valve stem assembly 1212 with an apparatus such as a motor. A cam 1620 is disposed at the second end 1621. Auxiliary valve stem assembly 1212 has a pin 1624 extending therefrom. The pin 1624 rotates in the direction indicated by arrow 1622 about the longitudinal axis 1630 of the auxiliary valve stem assembly 1212.

In operation, the pin 1624 engages the slot 1512 of the rotating auxiliary plate 1210. In a first position, the position of the pin 1624 causes the openings 1510 to fully align with the secondary nozzles on the nozzle ring 228 and maximize a fluid passage between the volute and the secondary nozzle. In a second position the pin 1624 causes the rotating auxiliary plate to rotate about the longitudinal axis of the turbine assembly so that the openings 1510 do not align with the secondary nozzles. Of course, the pin 1624 may be positioned in any position between the first position and the second position to allow partial alignment of the openings 1510 with the secondary nozzles to provide at least some fluid passage.

Figure 17:
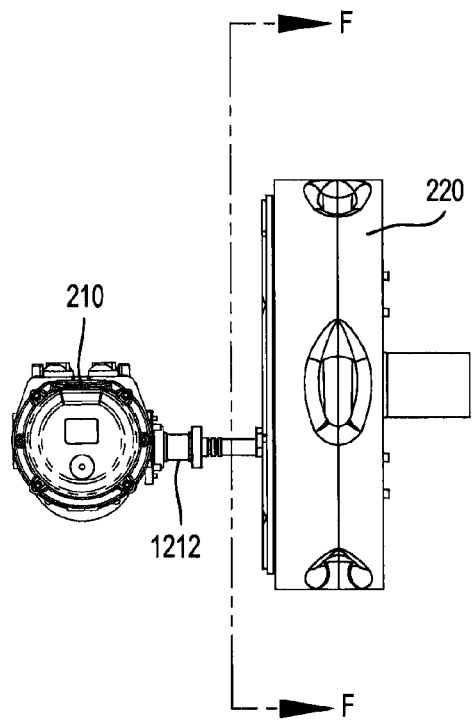
FIG. 17 is a simplified side view of the auxiliary valve stem assembly, rotary auxiliary plate and nozzle ring of the second example.

Referring now to FIG. 17, the actuator assembly 210 is illustrated relative to the nozzle ring 228. A section F-F through the auxiliary valve stem assembly 1212 is set forth.

Figure 18A:
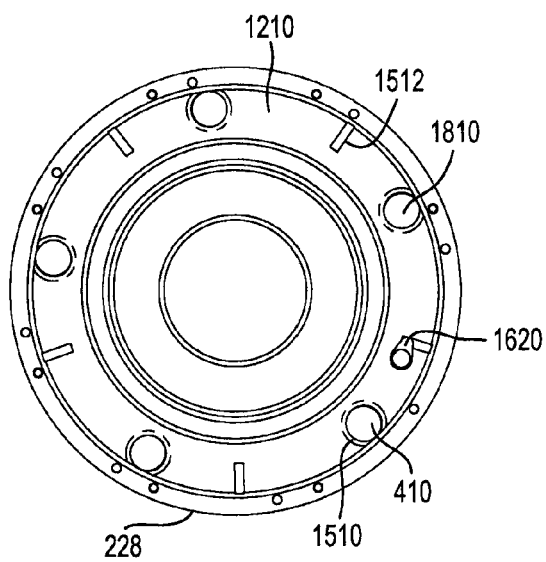

Referring now to FIGS. 18A, 18B and 18C, various positions of the auxiliary valve stem assembly 1212 relative to section F-F of FIG. 17 are illustrated. The position of the underlying pin 1624 illustrated in FIGS. 16A and 16B causes the movement of the rotary auxiliary plate 1210. In FIG. 18A, the cam 1620 is in a first position in which the secondary nozzles 410 of the nozzle ring 228 are completely aligned with the openings 1510 of the rotary auxiliary plate 1210 to form a maximum fluid clearance 1810.

In FIG. 18B the openings 1510 of the rotating auxiliary plate 1210 are shown in partial alignment with the secondary nozzles 410 of the nozzle ring 228. In this position a partial flow of fluid from the volute into the secondary nozzles is set forth by the alignment or misalignment of the openings 1510 with the secondary nozzles 410. The fluid clearance 1810 is redirected from that of FIG. 18A.

Referring now to FIG. 18C, the openings 1510 of the rotary auxiliary plate 1210 are illustrated completely out of alignment with the secondary nozzles 410 of the nozzle ring 228. In this figure, the fluid clearance 1810 illustrated in FIGS. 18A and 18B is closed.

In operation, depending upon the desired turbine resistance, the amount of fluid passing through the secondary nozzles 410 may be controlled by rotating the rotary auxiliary plate 1210 into various positions to vary the area of the fluid clearance 1810. As illustrated in FIG. 18A, a complete alignment of the openings 510 and the rotary auxiliary plate 1210 with the secondary nozzles 410 is set forth. This allows a maximum flow of fluid from the volute through the secondary nozzles which are directed toward the vanes 226 of the impeller 224. In FIG. 18B more turbine resistance is desired and thus only a partial alignment of the secondary nozzles 410 with the rotary auxiliary plate 1210 is provided. The amount of alignment may be controlled to control the turbine resistance. In FIG. 18C the rotary auxiliary plate 1210 is completely not aligned with the secondary nozzles 410. As can be observed by comparing FIGS. 18A-18C, the position of the cam 1620 and thus the position of the pin 1624 changes. The pin 1624 engages the slot 1512 to rotate the rotary auxiliary plate 1210 around the axis of rotation 221 of the shaft 220 of the turbine assembly 200'.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A turbine comprising:
   a housing having a volute and an outlet;
   an impeller rotatable coupled to the housing;
   a nozzle ring having a plurality of primary nozzles and a plurality of secondary nozzles, said plurality of primary nozzles and said plurality of secondary nozzles direct fluid toward the impeller;
   an auxiliary valve assembly selectively communicating fluid from the volute to the plurality of secondary nozzles; and
   an actuator coupled to the auxiliary valve assembly moving the valve auxiliary assembly from a first position communicating fluid from the volute into the secondary nozzles to a second position blocking flow of fluid to the secondary nozzles.

2. The turbine as recited in claim 1 wherein the plurality of secondary nozzles are disposed symmetrically around the impeller.

3. The turbine as recited in claim 1 wherein the plurality of secondary nozzles extend into a surface of the nozzle ring perpendicular to an axis of rotation of the impeller.

4. The turbine as recited in claim 3 wherein the secondary nozzles extend axially into the nozzle ring.

5. The turbine as recited in claim 1 wherein the plurality of primary nozzles are fluidically coupled to the plurality of secondary nozzles.

6. The turbine as recited in claim 1 wherein the auxiliary valve assembly comprises an auxiliary plate coupled to the actuator, said actuator moves the auxiliary plate from the first position to the second position.

7. The turbine as recited in claim 6 wherein the housing comprises an axially extending wall having an opening, said wall disposed between the volute and an auxiliary chamber adjacent to the plurality of secondary nozzles.

8. The turbine as recited in claim 7 wherein the axially extending wall is disposed in a turbine end cap assembly.

9. The turbine as recited in claim 8 wherein the turbine end cap assembly comprises a turbine outlet.

10. The turbine as recited in claim 6 wherein the actuator moves the auxiliary plate in an axial direction.

11. The turbine as recited in claim 10 wherein the actuators comprises a valve stem assembly coupled to the auxiliary plate, said valve stem assembly rotates causing the auxiliary plate to move in the axial direction.

12. The turbine as recited in claim 11 wherein the actuator comprises a motor for rotating the stem assembly.

13. The turbine as recited in claim 11 wherein the actuator comprises a hand actuator for rotating the stem assembly.

14. The turbine as recited in claim 1 wherein the auxiliary valve assembly comprises a rotary auxiliary plate having a plurality of openings therethrough.

15. The turbine as recited in claim 14 wherein the actuator moves the rotary auxiliary plate around an axis of rotation of the impeller.

16. The turbine as recited in claim 14 wherein the actuator moves the rotary auxiliary plate from a first position in which the openings align with the secondary nozzles to allow fluid to flow from the volute to the secondary nozzles to a second position in which the openings are not aligned with the secondary nozzles.

17. The turbine as recited in claim 14 wherein the rotary auxiliary plate comprises a slot and the actuator comprises a cam and a pin, said pin disposed within the slot.

18. The turbine as recited in claim 17 wherein the actuator comprises a motor for rotating the cam.

19. The turbine as recited in claim 17 wherein the actuator comprises a hand actuator for rotating the cam.

20. A system comprising:
    the turbine as recited in claim 1 comprising a shaft; and
    a pump coupled to the shaft.

21. The system as recited in claim 20 further comprising a reverse osmosis housing in communication with the turbine and the pump.

22. A method of operating a turbine comprising:
    communicating fluid from a volute of the turbine through a plurality of primary nozzles of a nozzle ring to rotate an impeller on a shaft;
    actuating an actuator assembly to move an auxiliary valve assembly to open a plurality of secondary nozzles of the nozzle ring to fluid from the volute; and
    thereafter, rotating the impeller with fluid from the plurality of primary nozzles and plurality of secondary nozzles.

23. The method as recited in claim 22 further comprising a lowering a turbine resistance of the turbine in response to moving the auxiliary valve assembly to open the plurality of secondary nozzles.

24. The method as recited in claim 22 wherein actuating comprises moving an auxiliary plate in an axial direction and in response to moving, communicating fluid from the volute.

25. The method as recited in claim 22 wherein actuating comprises moving an auxiliary plate in an axial direction, and, in response to moving, communicating fluid from the volute through an opening in an axially extending wall of a turbine housing.

26. The method as recited in claim 22 wherein actuating comprises rotating a rotary auxiliary plate having openings therein in alignment with the secondary nozzles of the nozzle ring.

27. The method as recited in claim 26 wherein rotating an auxiliary plate comprises rotating the auxiliary plate by moving a pin disposed on a cam of an auxiliary valve stem assembly within a slot of the rotary auxiliary plate.

* * * * *